United States Patent [19]
Joseph et al.

[11] Patent Number: 5,363,147
[45] Date of Patent: Nov. 8, 1994

[54] AUTOMATIC VOLUME LEVELER

[75] Inventors: George L. Joseph, Knoxville; Steven M. Kaiser, Seymour, both of Tenn.

[73] Assignee: North American Philips Corporation, New York, N.Y.

[21] Appl. No.: 892,545

[22] Filed: Jun. 1, 1992

[51] Int. Cl.$^5$ .............................................. H04N 5/60
[52] U.S. Cl. .................................... 348/738; 381/108; 455/355
[58] Field of Search .............. 358/197, 198, 191.1, 358/194.1; 381/104, 105, 107, 108, 103; 455/219, 200.1, 232.1, 355; 348/731, 734, 737, 738; H04W 5/60

[56] References Cited

U.S. PATENT DOCUMENTS

| | | | |
|---|---|---|---|
| 4,406,923 | 9/1983 | Burne, III et al. | 381/108 |
| 4,625,240 | 1/1986 | Yablonski et al. | 381/104 |
| 4,686,707 | 8/1987 | Iwasakai et al. | 455/200.1 |
| 5,070,527 | 12/1991 | Lynn | 381/104 |
| 5,107,539 | 4/1992 | Kato et al. | 381/108 |
| 5,130,665 | 7/1992 | Walden | 381/104 |
| 5,164,830 | 11/1992 | Kim | 358/197 |

FOREIGN PATENT DOCUMENTS 4012451 10/1991 Germany ................ H03G 3/20

*Primary Examiner*—Mark R. Powell
*Assistant Examiner*—Jeffrey S. Murrell
*Attorney, Agent, or Firm*—Edward W. Goodman

[57] ABSTRACT

A circuit for controlling a reproduced volume level of an audio signal to a desired level includes a peak detector for detecting a peak amplitude level in the audio signal, a user operable control for generating a signal indicative of a desired amplitude level, a comparator for comparing the detected peak amplitude level in the audio signal with the desired amplitude level and for generating a comparison signal as a result of the comparison, and a voltage controlled amplifier coupled to the comparator for adjusting the peak amplitude level in the audio signal in dependence on the comparison signal. The output from the voltage controlled amplifier then has the desired level.

12 Claims, 3 Drawing Sheets

AUTOMATIC VOLUME LEVELER

BACKGROUND OF THE INVENTION

1. Field of The Invention

The subject invention relates to television receivers and the controlling of the audio volume level of a program being viewed.

In watching various television programs, a user adjusts the volume control so that the television receiver produces the audio signal at a desired volume level. However, in the case of broadcast television programs in which commercial advertising is inserted into the programs at various points in time, it frequently occurs that the volume level of the commercial advertising is significantly higher than that of the television program in which it is inserted. This results in the desired volume level being exceeded. The user must then either tolerate this increased volume level, or adjust the volume level back to the desired volume level. Then when the television program comes back on after the commercial advertising, the volume level must again be adjusted to the desired volume level. This problem also arises when the user changes from viewing one channel to another or when changing to another signal source (broadcast/cable, VCR, VLP, etc.).

2. Description of The Related Art

U.S. Pat. No. 3,991,272 to Tarr discloses an audio AGC amplifier for limiting the acoustic power to the receiver portion of a telephone operator's headset for controlling this acoustic power to some level below that at which damage to the operator's hearing can occur. While this circuit will control the upper level of the audio signal, there is no provision for adjusting the level nor for raising the level of a low level signal to a desired level.

SUMMARY OF THE INVENTION

It is an object of the present invention to provide a a television receiver which, after a desired volume level is set, maintains the desired volume level regardless of changes in the program material.

It is a further object of the present invention to provide a television receiver which, after a desired volume level is set, maintains the desired volume level regardless of changes in the channel to which the television receiver is tuned.

It is an additional object of the present invention to provide a television receiver which, after a desired volume level is set, maintains the desired volume level regardless of changes in the signal source.

These objects are achieved in a circuit for controlling a reproduced volume level of an audio signal to a desired level comprising means for detecting a peak amplitude level in said audio signal, means for generating a signal indicative of a desired amplitude level, means for comparing said peak amplitude level in said audio signal with said desired amplitude level and for generating a comparison signal as a result of said comparing, and means coupled to said comparing means for adjusting said peak amplitude level in said audio signal in dependence on said comparison signal.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 1:
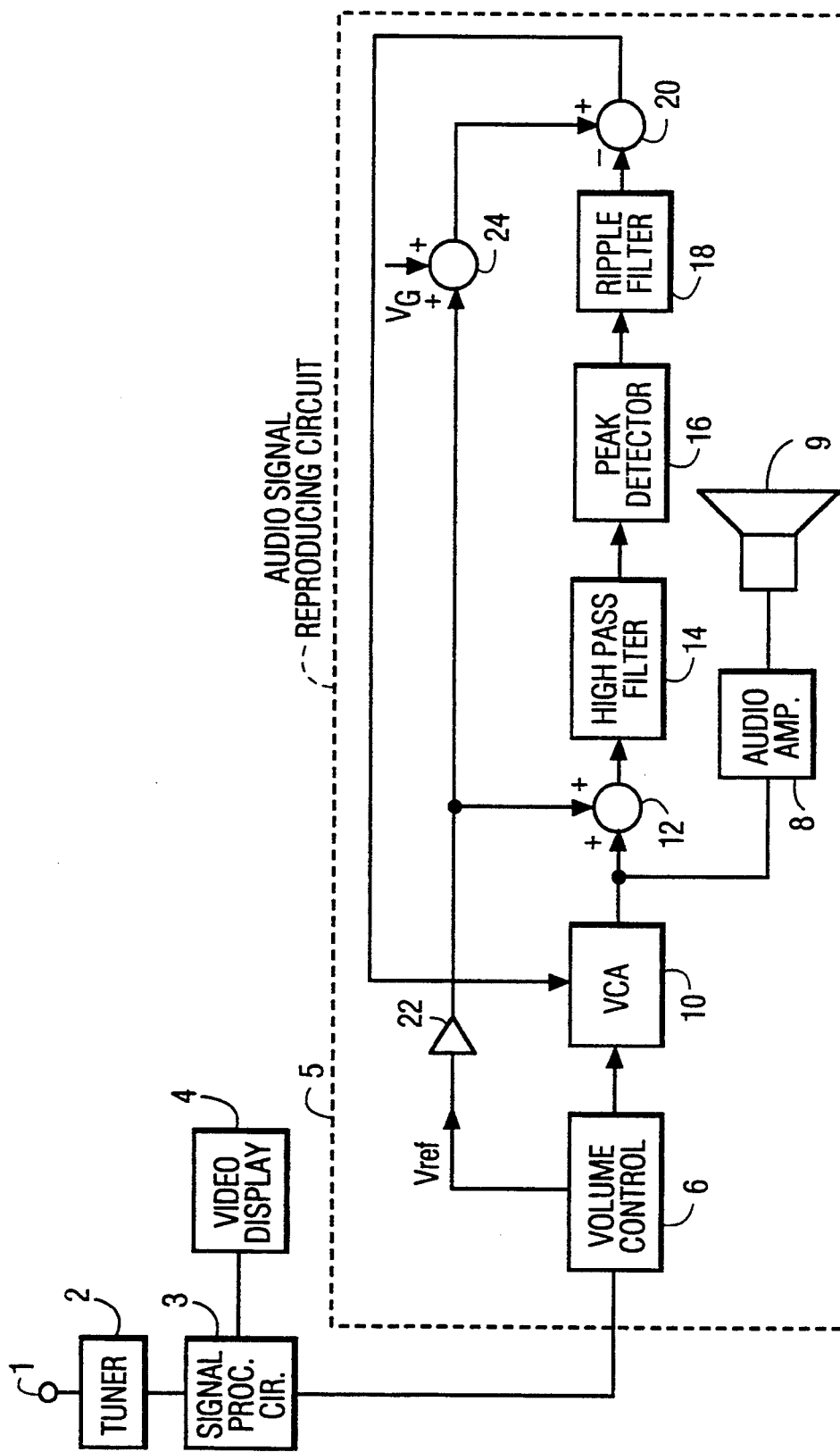
FIG. 1 is a block diagram of a first embodiment of the invention incorporated in a television receiver.

A first embodiment of the invention is shown in block diagram form in FIG. 1. A television receiver includes an input 1 for receiving television signals. These signals are applied to a tuner 2 for selectively tuning to one of the television signals. This television signal is then applied to a signal processing circuit 3 which separates the video and audio signal components and provides them at separate outputs. The video signal component is applied to a video display 4 which may include other circuitry (not shown) for further processing of the video signal component. The audio signal component is applied as an input audio signal to an audio signal reproducing circuit 5 for generating an audible sound signal. The audio signal reproducing circuit 5 includes a volume control 6, controllable by the user, to which the input audio signal is applied. The output from the volume control is applied to a voltage controlled amplifier (VCA) 10. VCA 10 may be any voltage controlled amplifier which is capable of a gain > 1 as well as attenuation, the amount of gain/attenuation being logarithmically proportional to the control voltage. The output of VCA 10 forms the output of the invention, and is also applied to one input of adder 12. The output of the adder 12 is applied through a high-pass filter 14, which prevents low frequency components in the audio signal from affecting the control of the subject invention, to a peak detector 16. The peak detector 16 converts the audio signal to a DC signal proportional to the amplitude of the audio signal. The output from the peak detector 16 is applied to a ripple filter 18 and then to the minus (−) input of a subtractor 20.

A DC signal $V_{ref}$, for example from the volume control 6, or alternatively from a fixed DC supply (not shown), indicative of the desired volume level, is applied to a buffer amplifier 22 and then to a second input of adder 12 and also to one input of an adder 24 which receives at a second input a fixed voltage $V_G$ of, for example, 0.2 v. The output of the adder 24 is applied to the plus (+) input of subtractor 20. The output from the subtractor 20 is then applied to a control input of VCA 10. The output of VCA 10 is applied as an output signal to an audio amplifier 8 which drive a loudspeaker 8.

Figure 2:
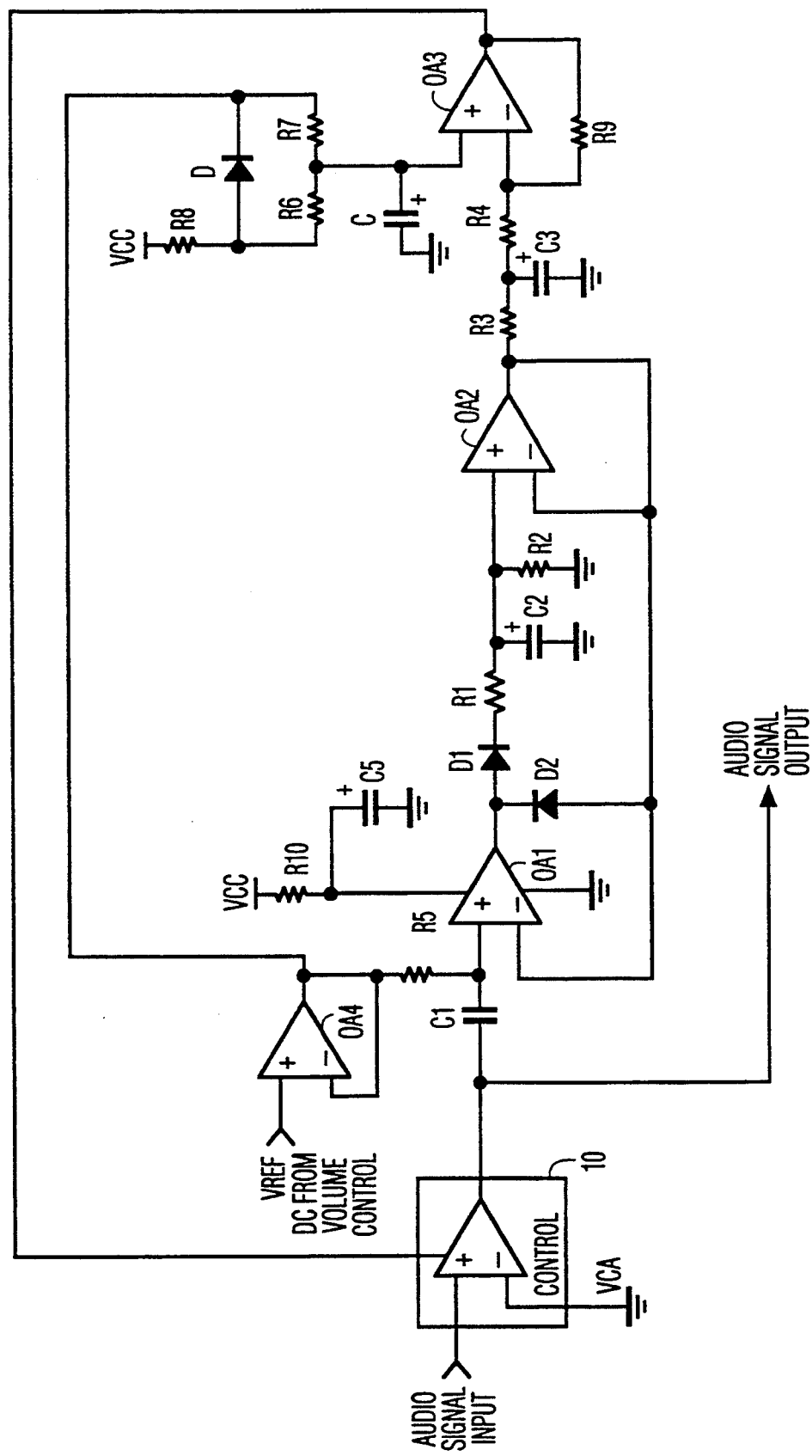
FIG. 2 is a schematic diagram of the first embodiment.

A practical implementation of the first embodiment of the invention is shown in the schematic of FIG. 2. The output from VCA 10 is connected to the audio signal output and via a capacitor C1 to the non-inverting input of operational amplifier OA1. The output from OA1 is applied through the series arrangement of a diode D1 and a resistor R1 to the non-inverting input of operational amplifier OA2. The output of OA2 is connected directly to the inverting inputs of OA1 and OA2 and, through diode D2 to the output of OA1. In addition, both capacitor C2 and resistor R2 connect the non-inverting input of OA2 to ground. The components OA1, OA2, D1, D2, R1, R2 and C2, form the high-pass filter 14 and the peak detector 16 of FIG. 1. The output of OA2 is then applied through the series combination of R3 and R4 to the inverting input of operational amplifier OA3, the junction between resistors R3 and R4 being connected to ground by a capacitor C3. The components R3, R4 and C3 form the ripple filter of FIG. 1.

The buffer amplifier 22 of FIG. 1 is formed by operational amplifier OA4 in which $V_{ref}$ is applied to the non-inverting input and the output is connected to the inverting input thereof. The output of OA4 is connected to the non-inverting input of OA1 via a resistor R5. In addition, the output of OA4 is connected to one end of a parallel combination of a diode D3 and two serially arranged resistors R6 and R7, the other end of the parallel combination being connected to a voltage source $V_{cc}$ via a resistor R8. The junction between resistors R6 and R7 is connected to the non-inverting input of OA3, which is further connected to ground via capacitor C4. The output of OA3 is connected through resistor R9 to its inverting input and is also connected to the control input of VCA 10. For completeness, the voltage $V_c$ is shown connected via a resistor R10 to a power input of OA1 and to ground via capacitor C5. To this end, it should be understood that OA1–OA4 may be part of a single, quad-op amp. integrated circuit, for example TL074.

Figure 3:
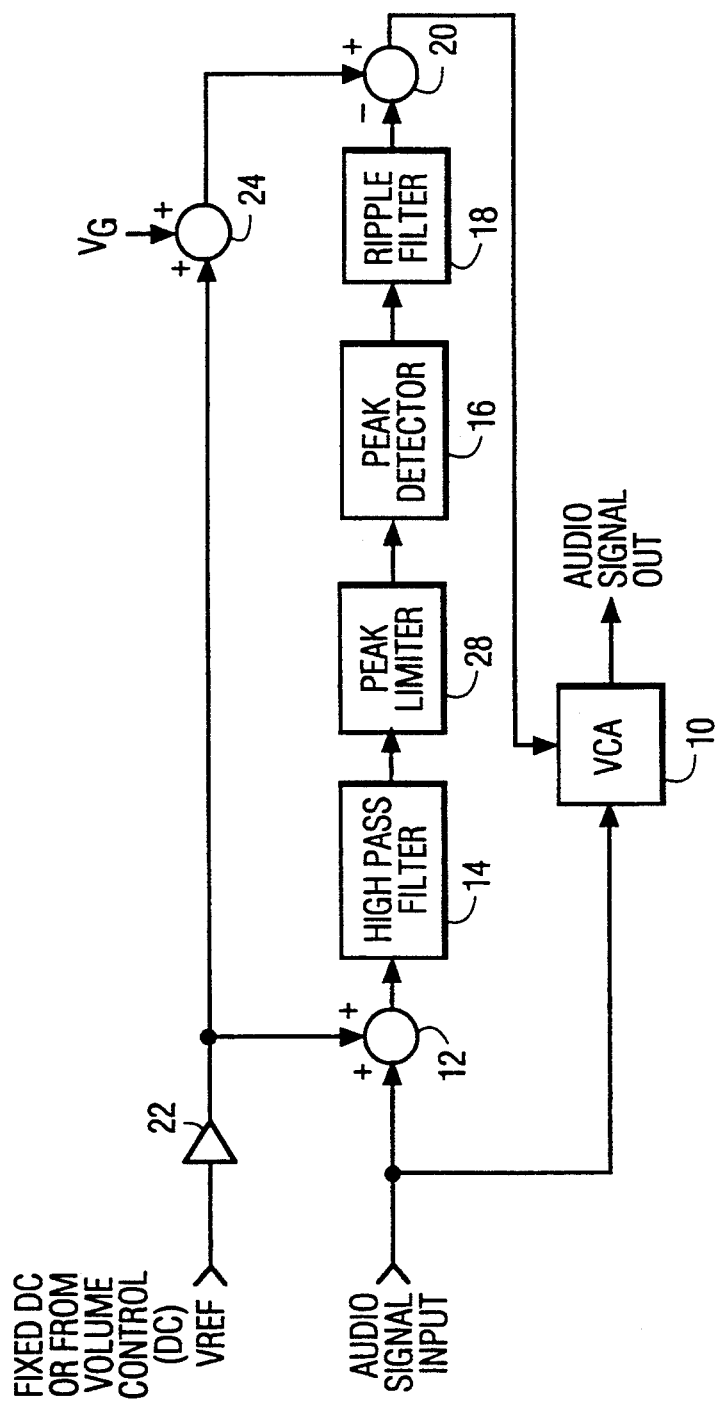
FIG. 3 is a block diagram of a second embodiment of the invention.

The first embodiment of the invention as described above and shown in FIGS. 1 and 2 is a closed loop configuration. A second embodiment of the invention is shown in block diagram form in FIG. 3 and is an open loop configuration. This second embodiment is substantially identical to that shown in FIG. 1 with the exception that the input audio signal is applied both to the VCA 10 as well as directly to adder 12, the output of VCA 10 forming the audio output of the subject invention. In order to prevent over reaction by the circuit to extreme volume differences, the circuit includes a peak limiter 28 inserted between the high-pass filter 14 and the peak detector 16.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A circuit for controlling a reproduced volume level of an audio signal to a desired level comprising:
   means for detecting a peak amplitude level in said audio signal;
   means for generating a signal indicative of a desired amplitude level;
   means for comparing said peak amplitude level in said audio signal with said desired amplitude level and for generating a comparison signal as a result of said comparing; and
   means coupled to said comparing means for adjusting said peak amplitude level in said audio signal in dependence on said comparison signal, wherein said adjusting means adjusts said peak amplitude level in said audio signal prior to said detecting means detecting said amplitude level in said audio signal.

2. A circuit as claimed in claim 1, wherein said detecting means comprises a peak detector followed by a ripple filter.

3. A circuit for controlling a reproduced volume level of an audio signal to a desired level comprising:
   means for detecting a peak amplitude level in said audio signal;
   means for generating a signal indicative of a desired amplitude level;
   means for comparing said peak amplitude level in said audio signal with said desired amplitude level and for generating a comparison signal as a result of said comparing; and
   means coupled to said comparing means for adjusting said peak amplitude level in said audio signal in dependence on said comparison signal, wherein said circuit further comprises means for rendering said circuit insensitive to low frequency components in said audio signal.

4. A circuit as claimed in claim 3, wherein said rendering means comprises a high-pass filter connected in front of said detecting means.

5. A circuit as claimed in claim 4, wherein said detecting means comprises a peak detector followed by a ripple filter.

6. A circuit as claimed in claim 3, wherein said detecting means comprises a peak detector followed by a ripple filter.

7. A television receiver having an input for receiving television signals, a tuner for tuning to a selected one of said television signals, signal processing means coupled to an output of said tuner for processing said selected television signal, said signal processing means having a first output for providing a video signal contained in said selected television signal, and a second output for providing an audio signal contained in said selected television signal, video display means for displaying said video signal at the first output of said signal processing means, and audio signal reproducing means for generating an audible sound signal corresponding to the audio signal at the second output of said signal processing means, characterized in that said audio signal reproducing means includes a circuit for controlling a reproduced volume level of the audio signal to a desired level, said circuit comprising:
   means for detecting a peak amplitude level in said audio signal;
   means for generating a signal indicative of a desired amplitude level;
   means for comparing said peak amplitude level in said audio signal with said desired amplitude level and for generating a comparison signal as a result of said comparing; and
   means coupled to said comparing means for adjusting said peak amplitude level in said audio signal in dependence on said comparison signal, wherein said adjusting means adjusts said peak amplitude level in said audio signal prior to said detecting means detecting said peak amplitude level in said audio signal.

8. A television receiver as claimed in claim 7, wherein said detecting means comprises a peak detector followed by a ripple filter.

9. A television receiver having an input for receiving television signals, a tuner for tuning to a selected one of said television signals, signal processing means coupled to an output of said tuner for processing said selected television signal, said signal processing means having a first output for providing a video signal contained in said selected television signal, and a second output for providing an audio signal contained in said selected television signal, video display means for displaying said video signal at the first output of said signal processing means, and audio signal reproducing means for generating an audible sound signal corresponding to the audio signal at the second output of said signal processing means, characterized in that said audio signal reproducing means includes a circuit for controlling a reproduced volume level of the audio signal to a desired level, said circuit comprising:

- means for detecting a peak amplitude level in said audio signal;
- means for generating a signal indicative of a desired amplitude level;
- means for comparing said peak amplitude level in said audio signal with said desired amplitude level and for generating a comparison signal as a result of said comparing; and
- means coupled to said comparing means for adjusting said peak amplitude level in said audio signal in dependence on said comparison signal, wherein said circuit further comprises means for rendering said circuit insensitive to low frequency components in said audio signal.

10. A television receiver as claimed in claim 9, wherein said rendering means comprises a high-pass filter connected in front of said detecting means.

11. A television receiver as claimed in claim 10, wherein said detecting means comprises a peak detector followed by a ripple filter.

12. A television receiver as claimed in claim 9, wherein said detecting means comprises a peak detector followed by a ripple filter.

* * * * *